(12) United States Patent
Yamamoto et al.

(10) Patent No.: US 10,696,119 B2
(45) Date of Patent: Jun. 30, 2020

(54) CONTROL APPARATUS OF DAMPING FORCE VARIABLE DAMPER, CONTROL SYSTEM, AND METHOD

(71) Applicant: AISIN SEIKI KABUSHIKI KAISHA, Kariya-shi, Aichi-ken (JP)

(72) Inventors: Akihito Yamamoto, Kariya (JP); Atsuto Ogino, Chiryu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 16/056,590

(22) Filed: Aug. 7, 2018

(65) Prior Publication Data
US 2019/0047347 A1 Feb. 14, 2019

(30) Foreign Application Priority Data
Aug. 9, 2017 (JP) .................................. 2017-154538

(51) Int. Cl.
 *B60G 17/0165* (2006.01)
 *B60G 17/06* (2006.01)
 *B60G 17/019* (2006.01)
(52) U.S. Cl.
 CPC ....... *B60G 17/0165* (2013.01); *B60G 17/019* (2013.01); *B60G 17/01908* (2013.01); *B60G 17/06* (2013.01); *B60G 2202/30* (2013.01); *B60G 2204/62* (2013.01); *B60G 2400/10* (2013.01); *B60G 2400/102* (2013.01); *B60G 2400/252* (2013.01); *B60G 2500/10* (2013.01); *B60G 2600/182* (2013.01); *B60G 2800/162* (2013.01)

(58) Field of Classification Search
 CPC .......... B60G 17/0165; B60G 17/01908; B60G 17/019; B60G 17/06; B60G 2800/162; B60G 2500/10; B60G 2400/252; B60G 2400/102; B60G 2400/10; B60G 2204/62; B60G 2202/30
 See application file for complete search history.

(56) References Cited

U.S. PATENT DOCUMENTS 9,278,599 B2 * 3/2016 Hirao ................... B60G 17/018

FOREIGN PATENT DOCUMENTS

| JP | 05104924 A | 4/1993 |
|---|---|---|
| JP | 2009286233 A | 12/2009 |

* cited by examiner

*Primary Examiner* — Fadey S. Jabr
*Assistant Examiner* — Chase L Cooley
(74) *Attorney, Agent, or Firm* — Buchanan Ingersoll & Rooney PC

(57) ABSTRACT

A control apparatus of a damping force variable damper that controls the damping force variable damper includes: a controller configured to control a damping force variation rate at a time of variation in a damping force of the damping force variable damper to be a predetermined damping force variation rate which is smaller than a predetermined oil hammer occurrence damping force variation rate at which an oil hammer occurs.

7 Claims, 12 Drawing Sheets

CONTROL APPARATUS OF DAMPING FORCE VARIABLE DAMPER, CONTROL SYSTEM, AND METHOD

CROSS REFERENCE TO RELATED APPLICATIONS

This application is based on and claims priority under 35 U.S.C. § 119 to Japanese Patent Application 2017-154538, filed on Aug. 9, 2017, the entire contents of which are incorporated herein by reference.

TECHNICAL FIELD

This disclosure relates to a control apparatus of a damping force variable damper, a control system, and a method.

BACKGROUND DISCUSSION

In the related art, there has been known a damping force variable damper, which is capable of providing a required optimum damping force depending on a driving state when absorbing vibrations in order to improve steering stability and ride comfort in a vehicle.

The damping force is determined by the product of a damping coefficient and a stroke speed, but the stroke speed is uniquely determined in the driving state of the vehicle. Therefore, in the damping force variable damper, the damping force may be effectively varied by varying the damping coefficient. See, for example, JP2009-286233A (Reference 1) and JP05-104924A (Reference 2).

By the way, in an actual damping force variable damper, when the damping force is abruptly changed, the flow of oil rapidly varies in the damping force variable damper and an oil hammer occurs, which causes the generation of sound (impact sound).

In order to avoid this, it may be necessary to slowly vary the flow of oil in the damping force variable damper, that is, to slowly perform variation in damping force, but it may take time to achieve a target damping force and there is a risk of causing a deterioration in steering stability and a deterioration in ride comfort.

Thus, a need exists for a control apparatus of a damping force variable damper which is not susceptible to the drawback mentioned above.

SUMMARY

A control apparatus of a damping force variable damper according to an aspect of this disclosure is a control apparatus of a damping force variable damper that controls a damping force variable damper. The control apparatus includes a controller configured to control a damping force variation rate at a time of variation in a damping force of the damping force variable damper to be a predetermined damping force variation rate, which is smaller than a predetermined oil hammer occurrence damping force variation rate at which an oil hammer occurs.

A control system according to an aspect of this disclosure includes an acceleration sensor configured to detect an acceleration of a control object and output an acceleration detection signal; a stroke sensor configured to output a stroke speed corresponding signal that corresponds to a stroke speed of the control object; a damping force variable damper configured to vary a damping force thereof in response to a control signal; and a control apparatus configured to: calculate a target damping force amount based on the acceleration detection signal and calculate a stroke speed based on the stroke speed corresponding signal; and when generating the control signal based on the target damping force amount and the stroke speed, control a damping force variation rate of the damping force variable damper to be a predetermined damping force variation rate, which is smaller than a predetermined oil hammer occurrence damping force variation rate at which an oil hammer occurs.

A method according to an aspect of this disclosure is a method executed by a control system including a damping force variable damper that varies a damping force thereof. The method includes detecting an acceleration of a control object of the damping force variable damper and a value corresponding to a stroke speed, calculating a target damping force amount based on the acceleration and calculating a stroke speed based on the value corresponding to the stroke speed, and controlling a damping force variation rate of the damping force variable damper to be a predetermined damping force variation rate, which is smaller than a predetermined oil hammer occurrence damping force variation rate at which an oil hammer occurs.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment is disclosed. A configuration of the embodiment described below, and an action, result, and effect caused by the configuration are given by way of example. This disclosure may be realized by other than the configuration disclosed in the following embodiment, and at least one of various effects based on the basic configuration and derived effects may be obtained.

Figure 1:
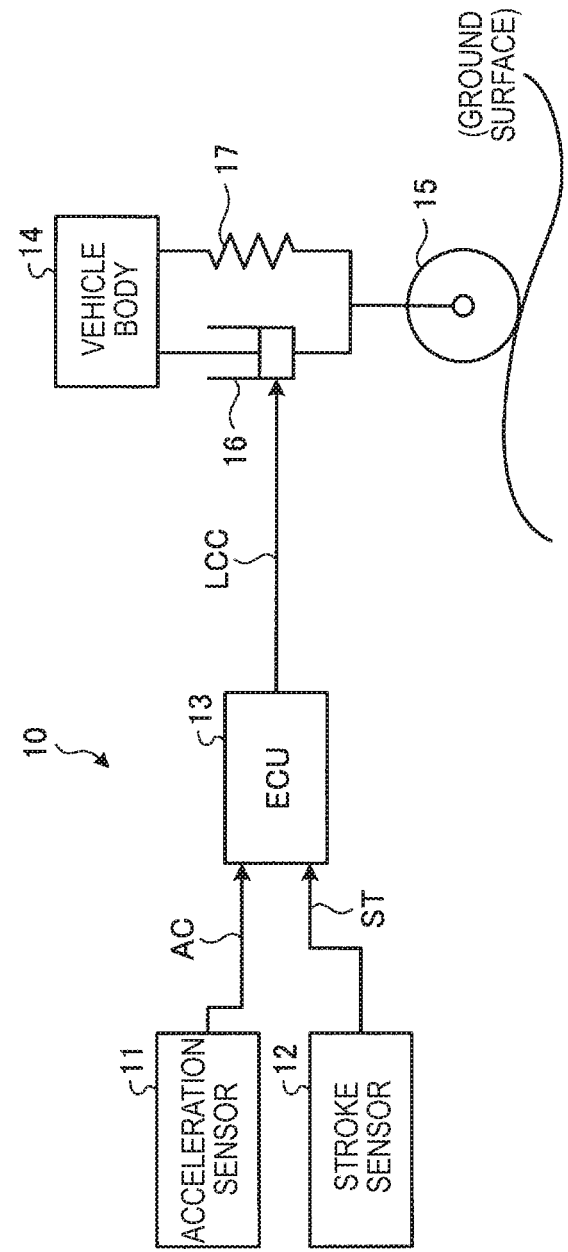
FIG. 1 is a block diagram illustrating a schematic configuration of a control system of a damping force variable damper according to an embodiment.

FIG. 1 is a block diagram illustrating a schematic configuration of a control system of a damping force variable damper according to an embodiment.

A control system 10 of the damping force variable damper includes: an acceleration sensor 11, which detects the acceleration of a vehicle (acceleration at the time of vibration), in which the control system 10 is mounted, and outputs an acceleration detection signal AC; a stroke sensor 12, which outputs a stroke speed corresponding signal ST that corresponds to the stroke speed of the vehicle; an ECU 13, which performs damping force variable control based on the acceleration detection signal AC and the stroke amount detection signal ST; and a damping force variable damper 16 and a spring 17, which are disposed between a vehicle body 14 and a wheel 15 to absorb vibrations in cooperation with each other.

In the above configuration, as the stroke sensor 12, for example, an acceleration sensor, which detects the acceleration of the vehicle in the vertical direction, or a vehicle height sensor, which detects the height of the vehicle, may be applied. When the acceleration sensor is used as the stroke sensor 12, the stroke speed is obtained by integrating an acceleration as the obtained stroke speed corresponding signal ST. When the vehicle height sensor is used as the stroke sensor 12, the stroke speed is obtained by differentiating a stroke amount as the obtained stroke speed corresponding signal ST.

In addition, instead of the stroke sensor 12, the acceleration sensor 11 may also be used as a stroke sensor when the acceleration sensor is capable of detecting the acceleration of the vehicle in the stroke direction.

Next, damping force variable control of the embodiment will be described.

Figure 2:
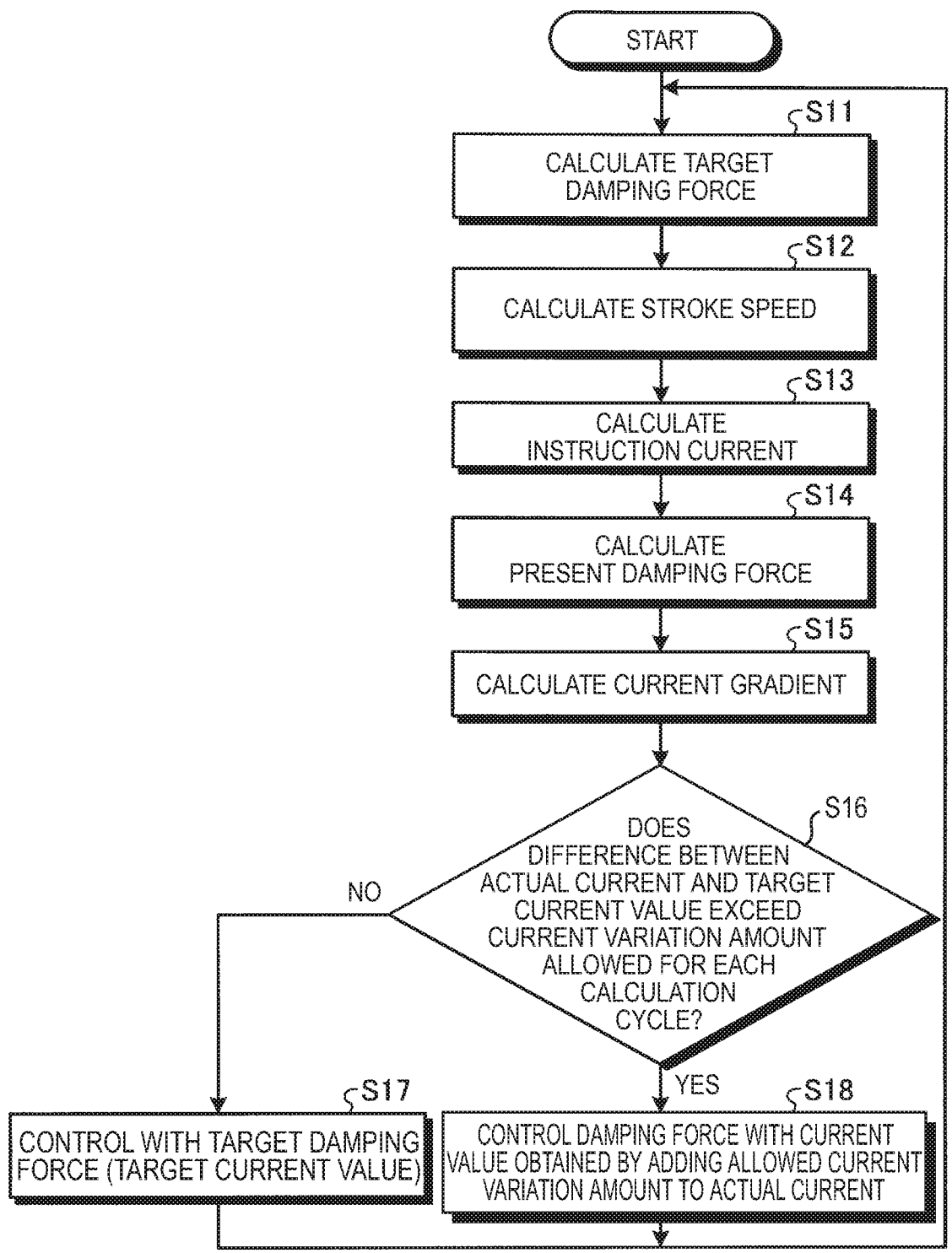
FIG. 2 is a processing flowchart of damping force variable control according to the embodiment.

FIG. 2 is a processing flowchart of damping force variable control according to the embodiment.

Figure 3:
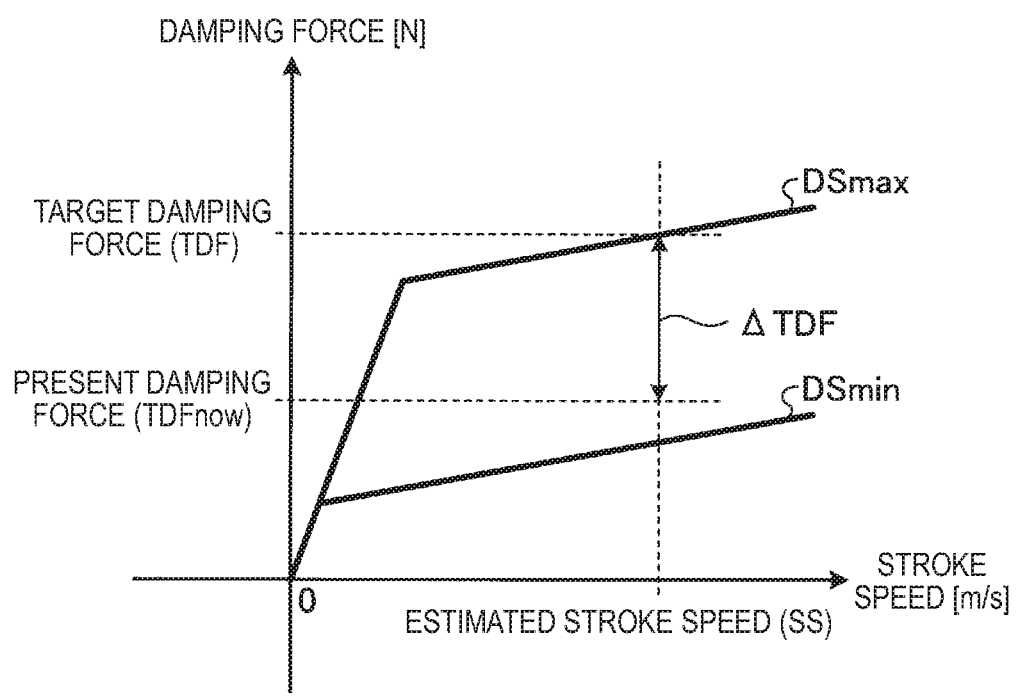
FIG. 3 is an explanatory diagram of damping force variable control according to the embodiment.

FIG. 3 is an explanatory diagram of the damping force variable control of the embodiment.

In FIG. 3, the upper crank-type curve DSmax is a damping force variation curve (maximum damping force variation curve) when a damping force of the damping force variable damper 16 is varied at the maximum rate, the lower crank-type curve DSmin is a damping force variation curve (minimum damping force variation curve) when the damping force of the damping force variable damper 16 is varied at the minimum rate, and the range between the two curves is a damping force that may be actually generated in the damping force variable damper 16.

In addition, it is assumed that variation in the damping force at the same stroke speed SS is linear.

In the damping force variable control, first, when reaching a predetermined damping force control timing, the ECU 13 calculates a target damping force TDF as illustrated in FIG. 3 (step S11).

Subsequently, the ECU 13 calculates and estimates a present stroke speed SS based on the stroke speed corresponding signal ST output from the stroke sensor 12 (step S12).

Then, the ECU 13 calculates instruction current required for obtaining the target damping force TDF (step S13).

Subsequently, based on the estimated present stroke speed SS, the ECU 13 calculates a damping force set in the damping force variable damper 16 at the present time, that is, a present damping force TDFnow (step S14).

Subsequently, the ECU 13 calculates a current variation rate (current gradient) CCL per unit time under the assumption that the stroke speed SS calculated in step S12 is not varied (step S15).

More specifically, the ECU 13 calculates a difference between the present damping force TDFnow and the target damping force TDF, and calculates the number of calculation cycles required for causing the present damping force TDFnow to reach the target damping force TDF so as to prevent the occurrence of an oil hammer. Then, the ECU 13 calculates a difference between the current value corresponding to the present damping force TDFnow and the current value corresponding to the target damping force TDF, and divides the calculated current value difference by the number of calculation cycles, thereby calculating the current variation rate (current gradient) CCL per unit time.

Subsequently, the ECU 13 determines whether or not a difference between actual current LCCnow and a target current value CC exceeds a current variation amount allowed for each calculation cycle, which is calculated from the calculated current variation rate CCL per unit time (step S16).

Here, since the current variation amount allowed for each calculation cycle, which is calculated from the calculated current variation rate CCL per unit time, is different between when increasing the damping force and when decreasing the damping force, the current variation amount is appropriately calculated according to whether the damping force is increased or decreased.

When it is determined in step S16 that the difference between the actual current LCCnow and the target current value CC does not exceed the current variation amount allowed for each calculation cycle, which is calculated from the calculated current variation rate CCL per unit time (step S16; No), there is no risk of the occurrence of an oil hammer. Thus, the ECU 13 performs damping force control by controlling the current, which is supplied to the damping force variable damper 16, to become the current corresponding to the target current value CC so that the damping force becomes the target damping force TDF until the next calculation timing (damping force control timing) (step S17), and returns the processing to step S11.

When it is determined in step S16 that the difference between the actual current LCCnow and the target current value CC exceeds the current variation amount for each calculation cycle, which is calculated from the calculated current variation rate CCL per unit time (step S16; Yes), there is a risk of the occurrence of an oil hammer. Thus, the ECU 13 performs damping force control by controlling the current to have a current value, obtained by adding the current variation amount allowed for each calculation cycle, which is calculated from the current variation rate CCL, to the actual current LCCnow (step S18), and returns the processing to step S11.

Therefore, in any case, since the current variation amount, which corresponds to the damping force variation amount per unit time during the period up to the next calculation timing (damping force control timing), does not exceed the current variation amount allowed for each calculation cycle, which is calculated from the current variation rate CCL, it is possible to prevent the occurrence of an oil hammer and to prevent the generation of sound.

Although the above description is an outline of the embodiment, in order to control the damping force (=the damping coefficient C×a stroke speed V) in the actual damping force variable damper 16, it is necessary to control the damping coefficient C. More specifically, the damping coefficient C (∵ C∝I) is controlled by controlling a current I flowing through an actuator of the damping force variable damper 16.

Hereinafter, an actual control example will be described.

Figure 4:
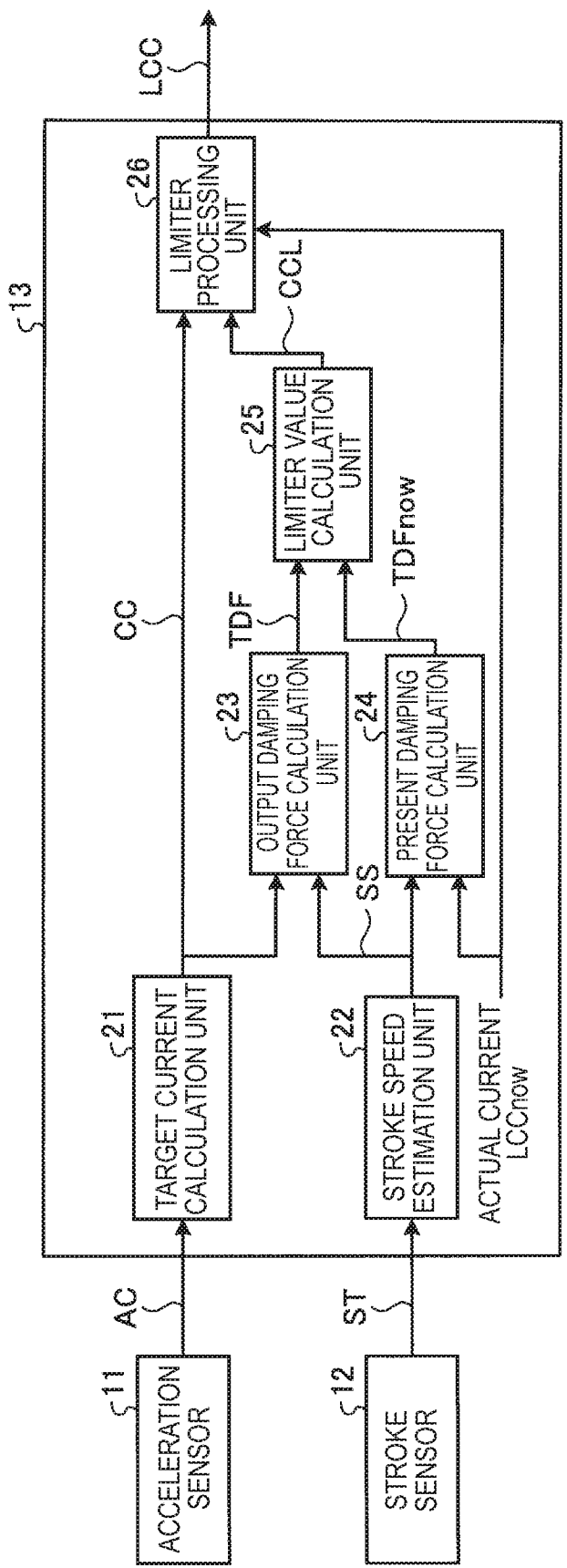
FIG. 4 is a block diagram illustrating a functional configuration at the time of damping force variable control in an ECU.

FIG. 4 is a block diagram illustrating a functional configuration at the time of damping force variable control in the ECU.

In this case, in the actual damping force variable damper 16, the damping coefficient may not be changed infinitely, but may be changed within the range of the maximum damping coefficient Cmax (e.g., corresponding to the maximum damping force variation curve DSmax in FIG. 3) and the minimum damping coefficient Cmin (e.g., corresponding to the minimum damping force variation curve DSmin in FIG. 3).

The ECU 13 includes: a target current calculation unit 21, which calculates and outputs the target current value CC, which is supplied to the damping force variable damper 16, in order to obtain the target damping force TDF, which is the damping force required for the damping force variable damper 16, based on the acceleration detection signal AC output from the acceleration sensor 11; a stroke speed estimation unit 22, which estimates and outputs the stroke speed SS from the stroke speed corresponding signal ST output from the stroke sensor 12; an output damping force calculation unit 23, which calculates and outputs the target damping force TDF based on the target current CC and the stroke speed SS; a present damping force calculation unit 24, which calculates and outputs the present damping force TDFnow based on the stroke speed SS and the actual current LCCnow, which is currently supplied to the damping force variable damper 16; a limiter value calculation unit 25, which calculates and outputs the current variation rate (current gradient) CCL per unit time based on the target damping force TDF and the present damping force TDFnow by calculating a difference between the current value corresponding to the present damping force TDFnow and the current value corresponding to the target damping force TDF and dividing the calculated current value difference by the number of calculation cycles; and a limiter processing unit 26, which determines whether or not a difference between the actual current LCCnow and the target current value CC exceeds the current variation amount allowed for each calculation cycle, which is calculated from the calculated current variation rate CCL per unit time, and based on the determined result, outputs, as an instruction current value LCC, the target current value CC or the current value obtained by adding the current variation amount for each calculation cycle, which is calculated from the current variation rate CCL, to the actual current LCCnow, to the actuator of the damping force variable damper 16.

Next, a specific operation of the ECU 13 will be described with reference to FIG. 2 again.

First, the target current calculation unit 21 of the ECU 13 calculates the target current value CC, which is supplied to the damping force variable damper 16, in order to obtain the target damping force TDF, which is the damping force required for the damping force variable damper 16, based on the acceleration detection signal AC output from the acceleration sensor 11, and outputs the target current value CC to the output damping force calculation unit 23 and the limiter processing unit 26.

The stroke speed estimation unit 22 estimates the stroke speed SS from the stroke speed corresponding signal ST output from the stroke sensor 12, and outputs the stroke speed SS to the output damping force calculation unit 23 and the present damping force calculation unit 24.

As a result, the output damping force calculation unit 23 calculates the target damping force TDF based on the target current value CC and the stroke speed SS, and outputs the target damping force TDF to the limiter value calculation unit 25.

On the other hand, the present damping force calculation unit 24 calculates the present damping force TDFnow based on the stroke speed SS and the actual current LCCnow, which is currently supplied to the damping force variable damper 16, and outputs the present damping force TDFnow to the limiter value calculation unit 25.

As a result, the limiter value calculation unit 25 calculates the current variation rate (current gradient) CCL per unit time by calculating the difference between the current value corresponding to the present damping force TDFnow and the current value corresponding to the target damping force TDF based on a difference ΔTDF (see FIG. 3) between the target damping force TDF and the present damping force TDFnow and dividing the calculated current value difference by the number of calculation cycles, and outputs the current variation rate CCL per unit time to the limiter processing unit 26.

The limiter processing unit 26 determines whether or not the difference between the actual current LCCnow and the target current value CC exceeds the current variation amount for each calculation cycle, which is calculated from the calculated current variation rate CCL per unit time, and based on the determined result, outputs, as the instruction current value LCC, the target current value CC or the current value obtained by adding the current variation amount for each calculation cycle, which is calculated from the current variation rate CCL, to the actual current LCCnow, to the actuator of the damping force variable damper 16.

More specifically, when the difference between the actual current LCCnow and the target current value CC does not exceed the current variation amount for each calculation cycle, which is calculated from the calculated current variation rate CCL per unit time, there is no risk of the occurrence of an oil hammer. Thus, the limiter processing unit 26 outputs, as the instruction current value LCC, the target current value CC to the actuator of the damping force variable damper 16 such that the damping force becomes the target damping force TDF until the next calculation timing (damping force control timing). In addition, when the difference between the actual current LCCnow and the target current value CC exceeds the current variation amount allowed for each calculation cycle, which is calculated from the calculated current variation rate CCL per unit time, there is a risk of the occurrence of an oil hammer. Thus, the limiter processing unit 26 outputs, as the instruction current value LCC, the current value obtained by adding the current variation amount for each calculation cycle, which is calculated from the current variation rate CCL, to the actual current LCCnow, to the actuator of the damping force variable damper 16.

Here, the reason why the above control is performed will be described.

Since the instruction current value LCC output to the damping force variable damper 16 and the actually generated damping force are not strictly proportional to each other, even if the instruction current value LCC is increased or decreased by a fixed amount, the variation rate of the damping force may not be constant.

Therefore, in the present embodiment, the current variation rate (current gradient) from the present damping force TDFnow to the target damping force TDF illustrated in FIG. 3 is calculated, and the current variation amount during the period corresponding to one calculation cycle is suppressed so that the maximum current variation rate at which no oil hammer occurs, that is, the difference between the actual current LCCnow and the target current value CC does not exceed the current variation amount allowed for each calculation cycle, which is calculated from the calculated current variation rate CCL per unit time, whereby optimal control, which reliably prevents the occurrence of an oil hammer, is realized.

Figure 5:
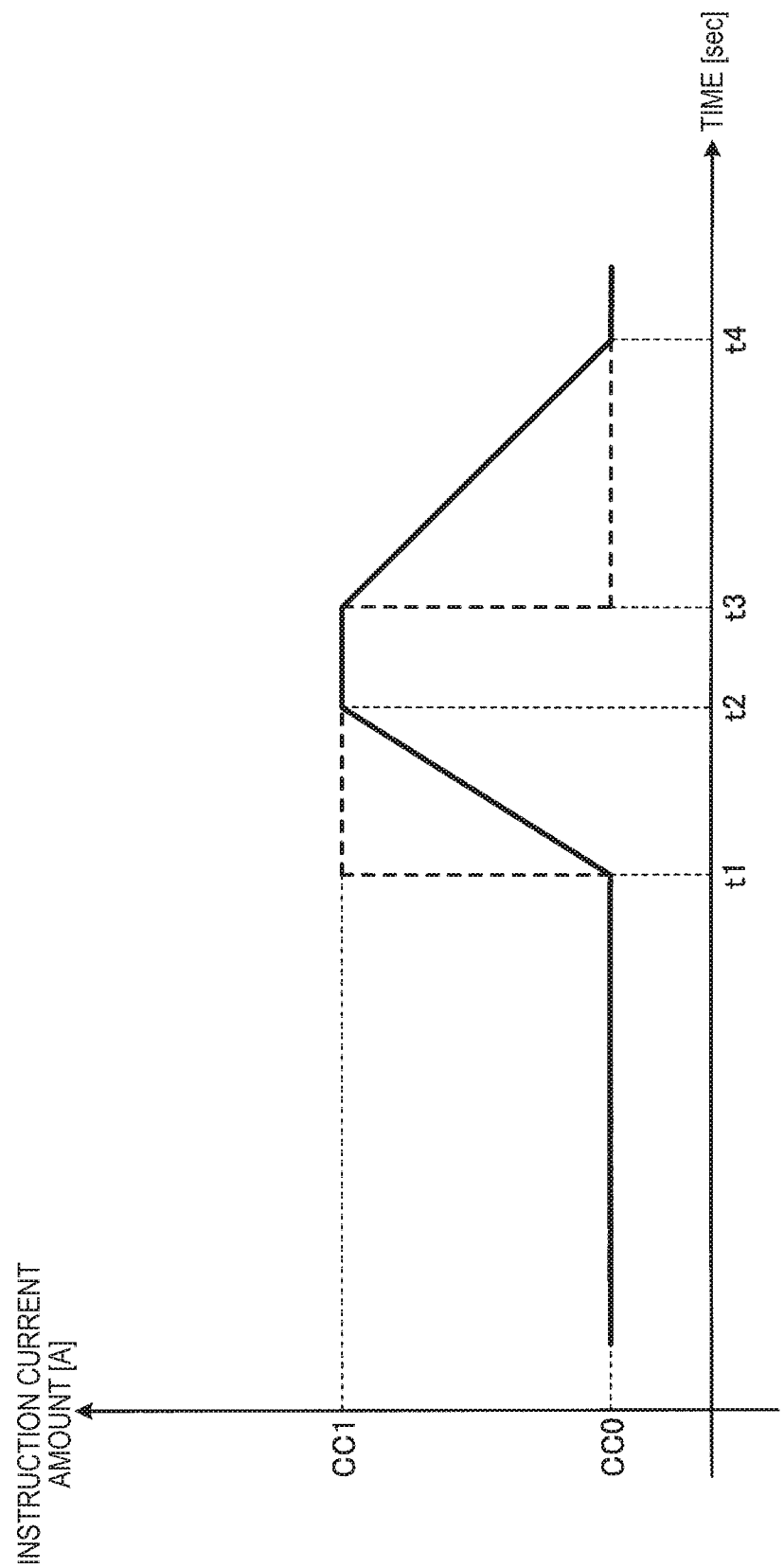
FIG. 5 is an explanatory diagram illustrating a relationship between instruction current and limit instruction current when a variation rate of current corresponding to the instruction current exceeds a variation rate limit value.

FIG. 5 is an explanatory diagram illustrating a relationship between the instruction current and the limit instruction current when the variation rate of current corresponding to the instruction current exceeds the variation rate limit value.

In FIG. 5, for ease of understanding, it is assumed that the stroke speed is constant (not varied) during one control cycle period. In actual control, a processing is performed under the assumption that the stroke speed is constant during one control cycle period (the period during which the processing from step S11 to step S18 in FIG. 2 is performed once).

As illustrated in FIG. 5, in a case where the target current calculation unit 21 determines that the instruction current CC is varied at time t1 from the instruction current CC=CC0 corresponding to the present actual current LCCnow to the instruction current CC=CC1 corresponding to the target current value CC as indicated by the broken line, when the current variation amount during the period corresponding to one calculation cycle exceeds the current variation amount for each calculation cycle, which is calculated from the calculated current variation rate CCL per unit time, the current variation rate limit unit 26 performs control so as to vary the current from the instruction current CC=CC0 to the instruction current CC=CC1 from the time t1 to time t2. That is, by preventing the current variation amount when a current amount difference, which corresponds to the difference between the actual current LCCnow and the target current value CC, is varied during the period corresponding to one calculation cycle from exceeding the current variation amount allowed for each calculation cycle, which is calculated from the calculated current variation rate CCL per unit time, the current variation amount becomes the current variation amount at which no oil hammer occurs, which may prevent the generation of sound.

Similarly, as illustrated in FIG. 5, in a case where the instruction current calculation unit 23 determines that the instruction current CC is varied at time t3 from the instruction current CC=CC1 corresponding to the present actual current LCCnow to the instruction current CC=CC0 corresponding to the target current value CC as indicated by the broken line, when the current variation amount during the period corresponding to one calculation cycle exceeds the current variation amount for each calculation cycle, which is calculated from the calculated current variation rate CCL per unit time, the current variation rate limit unit 26 performs control so as to vary the current from the instruction current CC=CC1 to the instruction current CC=CC0 from the time t3 to time t4. That is, by preventing the current variation amount when the current amount difference, which corresponds to the difference between the actual current LCCnow and the target current value CC, is varied during the period corresponding to one calculation cycle from exceeding the current variation amount allowed for each calculation cycle, which is calculated from the calculated current variation rate CCL per unit time, the current variation amount becomes the current variation amount at which no oil hammer occurs, which may prevent the generation of sound.

Figure 6:
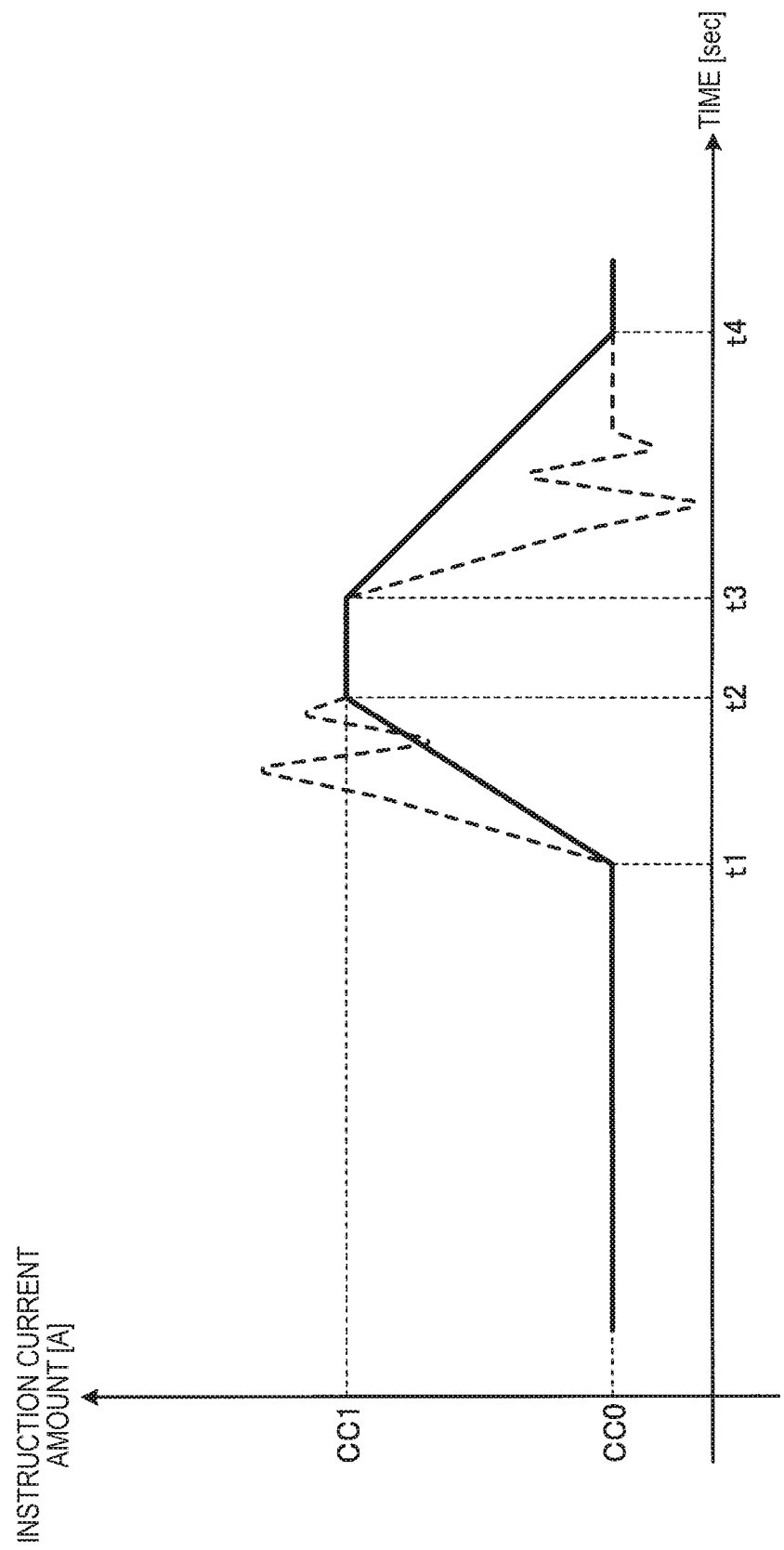
FIG. 6 is an explanatory diagram of an effect of the embodiment.

FIG. 6 is an explanatory diagram illustrating the effect of the embodiment.

As indicated by the solid line in FIG. 6, when the current variation rate is limited, the damping force variation curve having the same shape as the current variation curve illustrated by the solid line in FIG. 5 may be obtained, and as compared with the damping force variation curve in a case where the current variation rate is not limited as illustrated by the broken line in FIG. 6, it is possible to prevent the generation of sound while maintaining steering stability and ride comfort without fluctuation of variation in damping force.

In addition, in this case, the limiter processing unit 26 merely performs either a processing of outputting the input instruction current value CC as it is, or a processing of outputting a predetermined current variation rate limit value LCC, it is possible to shorten the processing time and to prevent the generation of sound while maintaining steering stability and ride comfort.

Next, a first modification of the embodiment will be described.

Figure 7:
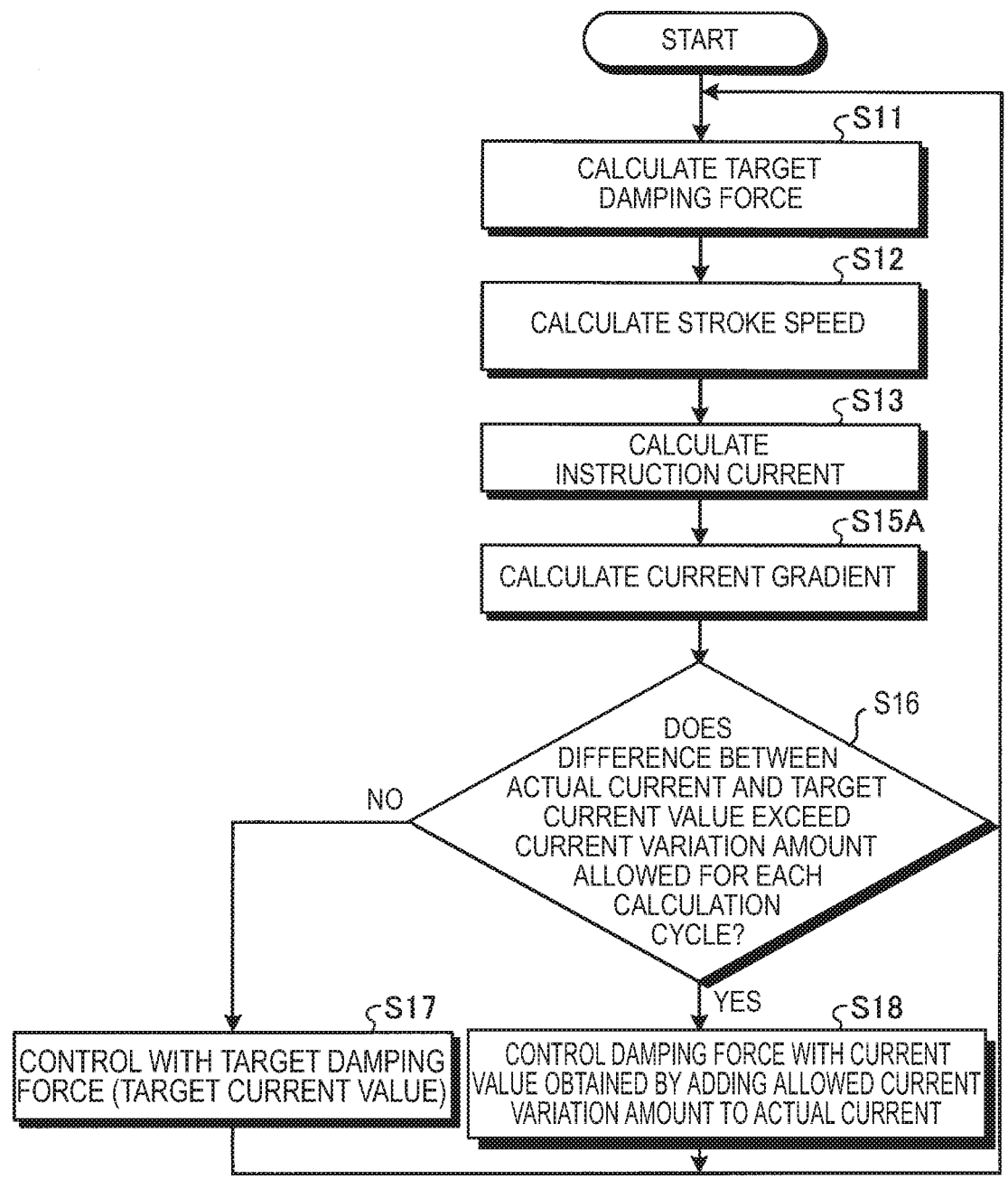
FIG. 7 is a processing flowchart of damping force variable control according to a first modification of the embodiment.

FIG. 7 is a processing flowchart of damping force variable control according to the first modification of the embodiment.

Figure 8:
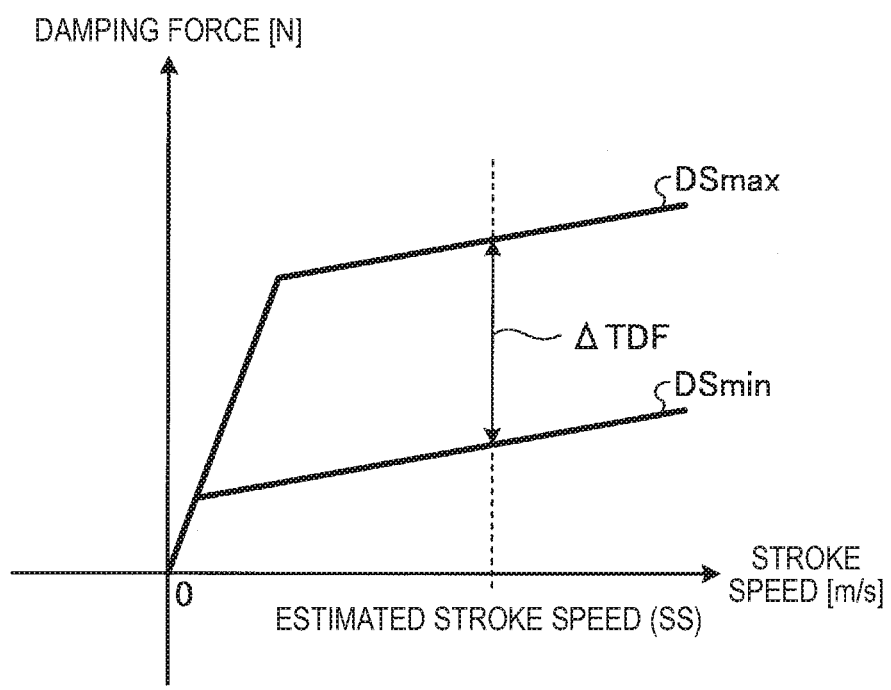
FIG. 8 is an explanatory diagram of damping force variable control according to the first modification of the embodiment.

FIG. 8 is an explanatory diagram of damping force variable control according to the first modification of the embodiment.

Figure 9:
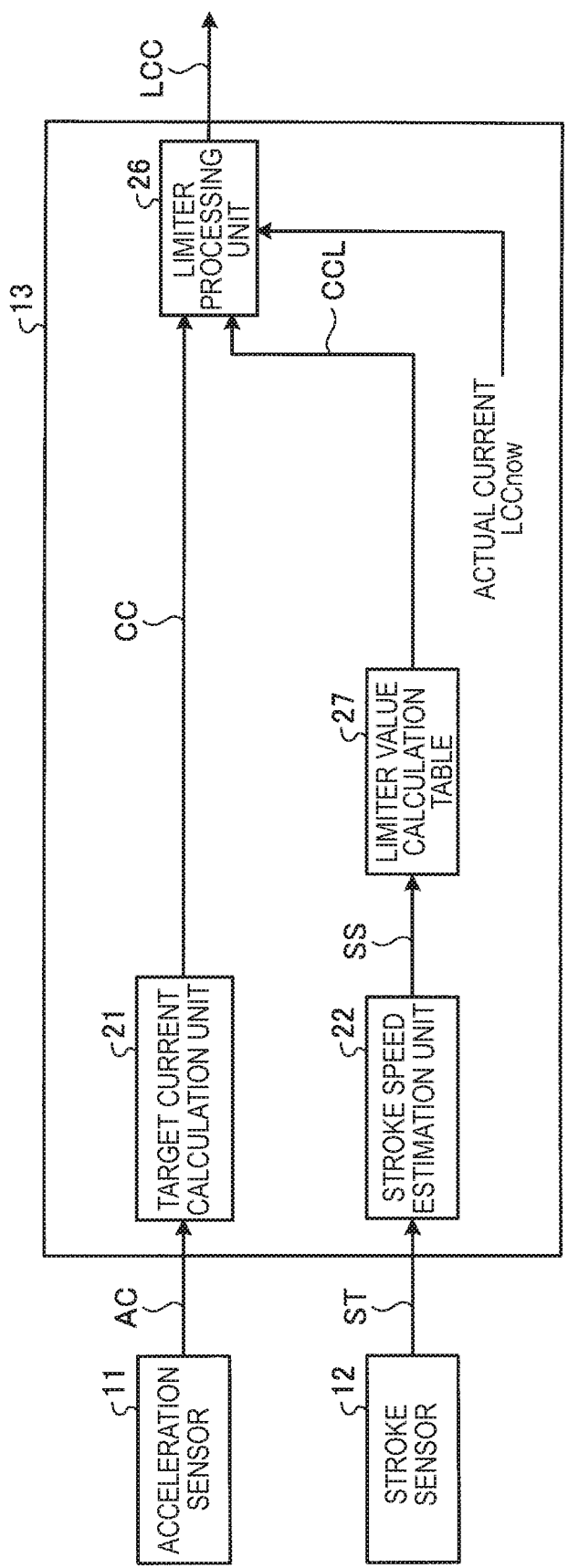
FIG. 9 is a block diagram illustrating a functional configuration at the time of damping force variable control in the ECU according to the first modification of the embodiment.

FIG. 9 is a block diagram illustrating a functional configuration at the time of damping force variable control in the ECU according to the first modification of the embodiment.

In the first modified example, similarly, in the actual damping force variable damper 16, the damping coefficient may not be changed infinitely, but may be changed within the range of the maximum damping coefficient Cmax (that corresponds, for example, to the maximum damping force variation curve DSmax in FIG. 8) and the minimum damping coefficient Cmin (that corresponds, for example, to the minimum damping force variation curve DSmin in FIG. 8).

The ECU 13 of the first modification, as illustrated in FIG. 9, includes the target current calculation unit 21, which calculates and outputs the target current value CC, which is supplied to the damping force variable damper 16, in order to obtain the target damping force TDF, which is the damping force required for the damping force variable damper 16, based on the acceleration detection signal AC output from the acceleration sensor 11, the stroke speed estimation unit 22, which estimates and outputs the stroke speed SS from the stroke speed corresponding signal ST output by the stroke sensor 12, a limiter value calculation table 27, which calculates and outputs the current variation rate (current gradient) CCL per unit time based on the target current CC and the stroke speed SS, and the limiter processing unit 26, which determines whether or not the difference between the actual current LCCnow and the target current value CC exceeds the current variation amount for each calculation cycle, which is calculated from the calculated current variation rate CCL per unit time, and based on the determined result, outputs, as the instruction current value LCC, the target current value CC or the current value obtained by adding the current variation amount for each calculation cycle, which is calculated from the current variation rate CCL, to the actual current LCCnow, to the actuator of the damping force variable damper 16.

In FIG. 8, the upper crank-type curve DSmax is the damping force variation curve (maximum damping force variation curve) in a case where the damping force of the damping force variable damper 16 is varied at the maximum ratio, the lower crank-type curve DSmin is the damping force variation curve (minimum damping force variation curve) when the damping force of the damping force variable damper 16 is varied at the minimum ratio, and the range between the two curves is the damping force that may be actually generated in the damping force variable damper 16.

In addition, it is assumed that variation in damping force at the same stroke speed SS is linear.

In the first modification, the processing from step S11 to step S13 is the same as in the above embodiment, and thus a detailed description thereof will be cited.

Upon completion of the processing from step S11 to step S13, the ECU 13 calculates a current gradient under the assumption that the stroke speed SS calculated in step S12 is not varied (step S15A).

More specifically, the ECU 13 calculates the number of control calculation cycles (corresponding to the damping force variation period) for performing damping force variable control so as to prevent the occurrence of an oil hammer when varying the damping force corresponding to a damping force control amount variation width ΔTDF, which is the difference between the damping force corresponding to the curve DSmax and the damping force corresponding to the curve DSmin, at the present stroke speed SS.

Specifically, with reference to the limiter value calculation table 27 in which the number of control calculation cycles (corresponding to the damping force variation period) is stored in advance so as to correspond to the stroke speed SS, the ECU 13 calculates the current variation rate (current gradient) CCL per unit time, which corresponds to the present stroke speed SS, and outputs the same to the limiter processing unit 26.

Subsequently, the ECU 13 determines whether or not the difference between the actual current LCCnow and the target current value CC exceeds the current variation amount allowed for each calculation cycle, which is calculated from the calculated current variation rate CCL per unit time (step S16).

Here, since the current variation amount allowed for each calculation cycle, which is calculated from the calculated current variation rate CCL per unit time, is different between when increasing the damping force and when decreasing the damping force, the current variation amount is appropriately calculated according to whether the damping force is increased or decreased.

When it is determined in step S16 that the difference between the actual current LCCnow and the target current value CC does not exceed the current variation amount for each calculation cycle, which is calculated from the calculated current variation rate CCL per unit time (step S16; No), since there is no risk of the occurrence of an oil hammer, the ECU 13 performs damping force control by controlling the current, which is supplied to the damping force variable damper 16, to become the current corresponding to the target current value CC so that the damping force becomes the target damping force TDF until the next calculation timing (damping force control timing), and returns the processing to step S11.

When it is determined in step S16 that the difference between the actual current LCCnow and the target current value CC exceeds the current variation amount allowed for each calculation cycle, which is calculated from the calculated current variation rate CCL per unit time (step S16; Yes), since there is a risk of the occurrence of an oil hammer, the ECU 13 performs damping force control by controlling the current to have the current value obtained by adding the current variation amount for each calculation cycle, which is calculated from the current variation rate CCL, to the actual current LCCnow (step S18), and returns the processing to step S11.

Therefore, in either case, since the current variation amount when the current amount difference, which corresponds to the difference between the actual current LCCnow and the target current value CC, is varied during the period corresponding to one calculation cycle does not exceed the current variation amount allowed for each calculation cycle, which is calculated from the calculated current variation rate CCL per unit time during the period up to the next calculation timing (damping force control timing), and the variation amount of the damping force per unit time does not exceed the predetermined damping force variation amount limit value, it is possible to prevent the occurrence of an oil hammer, thereby preventing the generation of sound.

Next, a second modification of the embodiment will be described.

Figure 10:
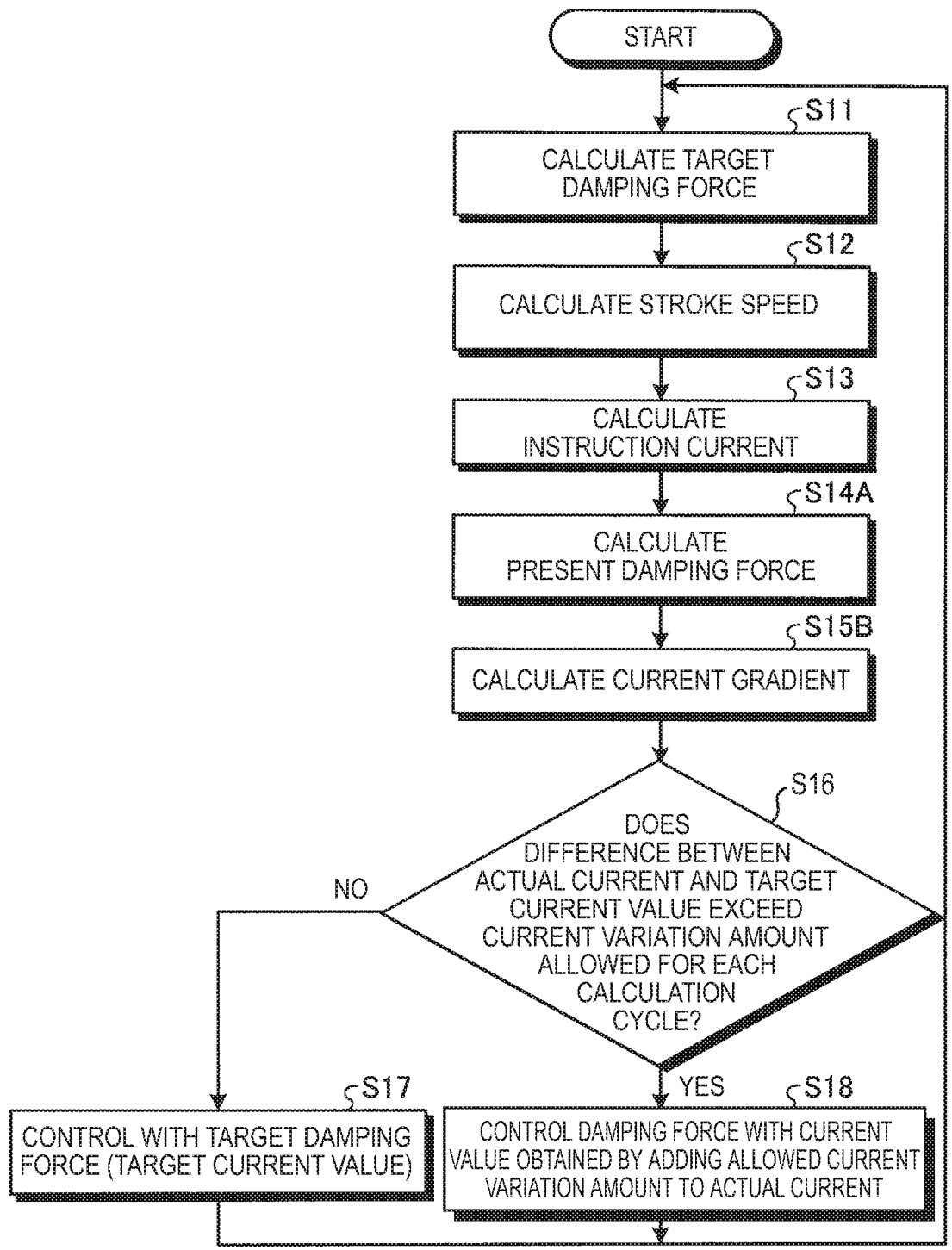
FIG. 10 is a processing flowchart of damping force variable control according to a second modification of the embodiment.

FIG. 10 is a processing flowchart of damping force variable control according to the second modification of the embodiment.

Figure 11:
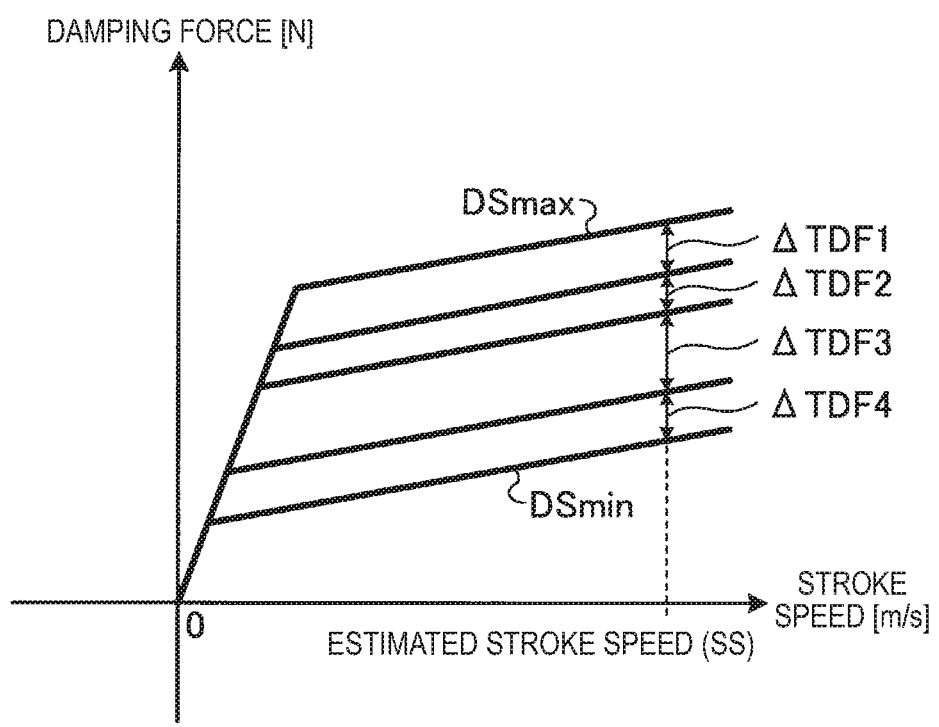
FIG. 11 is an explanatory diagram of damping force variable control according to the second modification of the embodiment.

FIG. 11 is an explanatory diagram of damping force variable control according to the second modification of the embodiment.

Figure 12:
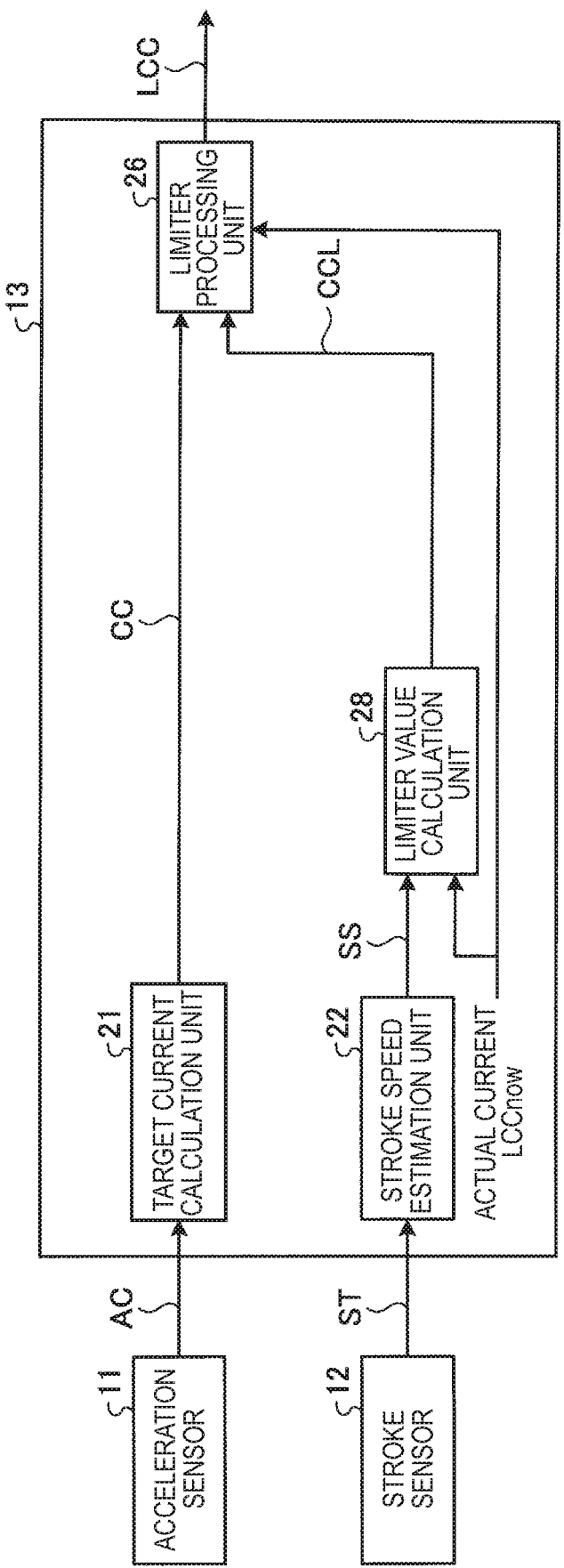
FIG. 12 is a block diagram illustrating a functional configuration at the time of damping force variable control in the ECU according to the second modification of the embodiment.

FIG. 12 is a block diagram illustrating a functional configuration at the time of damping force variable control in the ECU according to the second modification of the embodiment.

In FIG. 11, similarly, the upper crank-type curve DSmax is the damping force variation curve (maximum damping force variation curve) when the damping force of the damping force variable damper 16 is varied at the maximum ratio, the lower crank-type curve DSmin is the damping force variation curve (minimum damping force variation curve) when the damping force of the damping force variable damper 16 is varied at the minimum ratio, and the range between the two curves is the damping force that may be actually generated in the damping force variable damper 16.

In addition, it is assumed that variation in damping force at the same stroke speed SS is nonlinear.

As illustrated in FIG. 12, the ECU 13 of the second modification includes the target current calculation unit 21, which calculates and outputs the target current value CC, which is supplied to the damping force variable damper 16, in order to obtain the target damping force TDF, which is the damping force required for the damping force variable damper 16, based on the acceleration detection signal AC output from the acceleration sensor 11, the stroke speed estimation unit 22, which estimates and outputs the stroke speed SS from the stroke speed corresponding signal ST output by the stroke sensor 12, a limiter value calculation unit 28, which calculates and outputs the current variation rate (current gradient) CCL per unit time based on the actual current LCCnow, which is currently supplied to the damping force variable damper 16, and the stroke speed SS, and the limiter processing unit 26, which determines whether or not the difference between the actual current LCCnow and the target current value CC exceeds the current variation amount allowed for each calculation cycle, which is calculated from the calculated current variation rate CCL per unit time, and based on the determined result, outputs, as the instruction current value LCC, the target current value CC or the current value obtained by adding the current variation amount for each calculation cycle, which is calculated from the current variation rate CCL, to the actual current LCCnow, to the actuator of the damping force variable damper 16.

In the second modification, similarly, since the processing from step S11 to step S14 is also the same as in the above embodiment, a detailed description thereof will be cited.

Upon completion of the processing from step S11 to step S14, the ECU 13 calculates the current variation rate (current gradient) CCL per unit time under the assumption that the stroke speed SS calculated in step S12 is not varied (step S15B).

As illustrated in FIG. 11, in the second modification, even when the current supplied to the actuator of the damping force variable damper 16 is varied by the same current amount at the same stroke speed from the curve DSmin to the curve DSmax, the current and the damping force are varied nonlinearly. More specifically, as illustrated in FIG. 11, when the current supplied to the actuator of the damping force variable damper 16 at the same stroke speed SS is varied by the same current amount (e.g., by 1A), the damping force variation amount is $\Delta TDF\ 1 \neq \Delta TDF\ 2 \neq \Delta TDF\ 3 \neq \Delta TDF\ 4$.

Therefore, in the second modification, the limiter value calculation unit 28 calculates the current variation rate (current gradient) CCL per unit time based on the actual current LCCnow, which is currently supplied to the damping force variable damper 16, and the stroke speed SS, and outputs the same to the limiter processing unit 26 (step S15B). Specifically, first, the limiter value calculation unit 28 calculates the present damping force from the actual current LCCnow and the stroke speed SS. Subsequently, the limiter value calculation unit 28 calculates the target damping force by adding a predetermined damping force variation amount allowed for each calculation cycle to the present damping force, and then calculates the target current value, which corresponds to the calculated target damping force and the stroke speed SS. Then, the limiter value calculation unit 28 calculates the current variation rate (current gradient) CCL per unit time based on the difference between the calculated target current value and the actual current LCCnow. Here, since the current variation amount allowed for each calculation cycle, which is calculated from the calculated current variation rate CCL per unit time, is different between when increasing the damping force and when decreasing the damping force, the current variation amount is appropriately calculated according to whether the damping force is increased or decreased.

Next, the ECU 13 determines whether or not the difference between the actual current LCCnow and the target current value CC exceeds the current variation amount allowed for each calculation cycle, which is calculated from the calculated current variation rate CCL per unit time (step S16).

Here, since the current variation amount allowed for each calculation cycle, which is calculated from the calculated current variation rate CCL per unit time, is different between when increasing the damping force and when decreasing the damping force, the current variation amount is appropriately calculated according to whether the damping force is increased or decreased.

When it is determined in step S16 that the difference between the actual current LCCnow and the target current value CC does not exceed the current variation amount allowed for each calculation cycle, which is calculated from the calculated current variation rate CCL per unit time (step S16; No), since there is no risk of the occurrence of an oil hammer, the ECU 13 performs damping force control by controlling the current, which is supplied to the damping force variable damper 16, to become the current corresponding to the target current value CC so that the damping force becomes the target damping force TDF until the next calculation timing (damping force control timing), and returns the processing to step S11.

When it is determined in step S16 that the difference between the actual current LCCnow and the target current value CC exceeds the current variation amount allowed for each calculation cycle, which is calculated from the calculated current variation rate CCL per unit time (step S16; Yes), since there is a risk of the occurrence of an oil hammer, the ECU 13 performs damping force control by controlling the current to have the current value obtained by adding the current variation amount for each calculation cycle, which is calculated from the current variation rate CCL, to the actual current LCCnow (step S18), and returns the processing to step S11.

Therefore, in either case, since the current variation amount when the current amount difference, which corresponds to the difference between the actual current LCCnow and the target current value CC, is varied during the period corresponding to one calculation cycle does not exceed the current variation amount allowed for each calculation cycle, which is calculated from the calculated current variation rate CCL per unit time during the period up to the next calculation timing (damping force control timing), and the variation amount of the damping force per unit time does not exceed the predetermined damping force variation amount limit value, it is possible to prevent the occurrence of an oil hammer, thereby preventing the generation of sound.

Although the embodiment disclosed here has been described above, the embodiment is presented by way of example and is not intended to limit the scope of this disclosure. The novel embodiment may be implemented in various other forms, and various omissions, substitutions, and changes may be made without departing from the gist of this disclosure. The embodiment and the modifications thereof are included in the scope or gist of this disclosure, and are included in the invention described in the claims and the equivalent scope thereof.

For example, although the configuration of the damping force variable damper has not been described in detail in the above description, a damping force variable damper, which electrically controls the flow rate of the oil by a flow-rate control valve (current control or voltage control), or a damping force variable damper, which directly electrically controls the flow rate of oil, is possible.

In addition, application to a damping force variable damper using a magnetic fluid or a mechanical damping force variable damper is also possible.

In addition, in the above description, a semi-active suspension configuration is adopted, in which the damping force variable damper 16 and the spring 17 are disposed in parallel between the vehicle body 14 and the wheel 15, but an active suspension configuration is also possible. In this case, application to active suspension based on the Skyhook theory is also possible.

A control apparatus of a damping force variable damper according to an aspect of this disclosure is a control apparatus of a damping force variable damper that controls a damping force variable damper. The control apparatus includes a controller configured to control a damping force variation rate at a time of variation in a damping force of the damping force variable damper to be a predetermined damping force variation rate, which is smaller than a predetermined oil hammer occurrence damping force variation rate at which an oil hammer occurs.

According to the above configuration, when controlling the damping force variable damper, the damping force variation rate is controlled to be the predetermined damping force variation rate, which is smaller than the predetermined oil hammer occurrence damping force variation rate at which an oil hammer occurs. Thus, it is possible to prevent the generation of sound and to maintain steering stability and ride comfort.

In the control apparatus of the damping force variable damper according to an aspect of this disclosure, the predetermined damping force variation rate may be made different between when increasing the damping force and when decreasing the damping force.

According to the above configuration, since control may be performed with an optimum damping force variation rate when the damping force is controlled so as to be increased and when the damping force is controlled so as to be reduced, it is possible to more appropriately prevent the generation of sound and to maintain steering stability and ride comfort.

In the control apparatus of the damping force variable damper according to the aspect of this disclosure, the damping force variable damper may control the damping force thereof by current control, and the controller controls the damping force variable damper with a current variation rate corresponding to the damping force variation rate.

According to the above configuration, since the control of the damping force variable damper may be electrical control with the current variation rate, it is possible to easily and reliably prevent the generation of sound.

The control apparatus of the damping force variable damper according to the aspect of this disclosure may further include a target damping force calculation unit configured to calculate a target damping force, which is a damping force required for the damping force variable damper, based on an acceleration detection signal input from an acceleration sensor; and a present damping force calculation unit configured to calculate a present damping force based on a stroke speed, which is calculated from a signal input from a stroke sensor, and an actual current, which is currently supplied to the damping force variable damper, in which, when the damping force variation rate, which is calculated based on a difference between the target damping force and the present damping force, is greater than the predetermined oil hammer occurrence damping force variation rate, the controller controls the damping force variation rate to be the predetermined damping force variation rate.

In the control apparatus of the damping force variable damper according to the aspect of this disclosure, when the damping force variation rate, which is calculated based on the difference between the target damping force and the present damping force, is equal to or less than the predetermined oil hammer occurrence damping force variation rate, the controller controls the damping force variable damper with the damping force variation rate.

A control system according to an aspect of this disclosure includes an acceleration sensor configured to detect an acceleration of a control object and output an acceleration detection signal; a stroke sensor configured to output a stroke speed corresponding signal that corresponds to a stroke speed of the control object; a damping force variable damper configured to vary a damping force thereof in response to a control signal; and a control apparatus configured to: calculate a target damping force amount based on the acceleration detection signal and calculate a stroke speed based on the stroke speed corresponding signal; and when generating the control signal based on the target damping force amount and the stroke speed, control a damping force variation rate of the damping force variable damper to be a predetermined damping force variation rate, which is smaller than a predetermined oil hammer occurrence damping force variation rate at which an oil hammer occurs.

According to the above configuration, when controlling the damping force variable damper, the damping force variation rate is controlled to be the predetermined damping force variation rate, which is smaller than the predetermined oil hammer occurrence damping force variation rate at which an oil hammer occurs. Thus, it is possible to prevent the generation of sound and to maintain steering stability and ride comfort.

In the control system according to the aspect of this disclosure, the stroke sensor may be configured as an acceleration sensor that detects the acceleration of the control object in a stroke direction or a height sensor that detects a height of the control object in the stroke direction.

According to the above configuration, the flexibility of constructing the control system may be increased, and the construction of the control system may be facilitated.

A method according to an aspect of this disclosure is a method executed by a control system including a damping force variable damper that varies a damping force thereof. The method includes detecting an acceleration of a control object of the damping force variable damper and a value corresponding to a stroke speed, calculating a target damping force amount based on the acceleration and calculating a stroke speed based on the value corresponding to the stroke speed, and controlling a damping force variation rate of the damping force variable damper to be a predetermined damping force variation rate, which is smaller than a predetermined oil hammer occurrence damping force variation rate at which an oil hammer occurs.

According to the above configuration, when controlling the damping force variable damper, the damping force variation rate is controlled to be the predetermined damping force variation rate, which is smaller than the predetermined oil hammer occurrence damping force variation rate at which an oil hammer occurs. Thus, it is possible to prevent the generation of sound and to maintain steering stability and ride comfort.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A control apparatus of a damping force variable damper that controls the damping force variable damper, the control apparatus comprising:
a controller configured to:
control a damping force variation rate at a time of variation in a damping force of the damping force variable damper to be a predetermined damping force variation rate which is smaller than a predetermined oil hammer occurrence damping force variation rate at which an oil hammer occurs;

calculate a target damping force, which is a damping force required for the damping force variable damper, based on an acceleration detection signal input from an acceleration sensor; and calculate a present damping force based on a stroke speed, which is calculated from a signal input from a stroke sensor, and an actual current, which is currently supplied to the damping force variable damper, wherein, when the damping force variation rate, which is calculated based on a difference between the target damping force and the present damping force, is greater than the predetermined oil hammer occurrence damping force variation rate, the controller controls the damping force variation rate to be the predetermined damping force variation rate.

2. The control apparatus according to claim 1, wherein the predetermined damping force variation rate is made different between when increasing the damping force and when decreasing the damping force.

3. The control apparatus according to claim 1, wherein the damping force variable damper controls the damping force thereof by current control, and the controller controls the damping force variable damper with a current variation rate corresponding to the damping force variation rate.

4. The control apparatus according to claim 1, wherein, when the damping force variation rate, which is calculated based on the difference between the target damping force and the present damping force, is equal to or less than the predetermined oil hammer occurrence damping force variation rate, the controller controls the damping force variable damper with the damping force variation rate.

5. A control system comprising:
an acceleration sensor configured to detect an acceleration of a control object and output an acceleration detection signal;
a stroke sensor configured to output a stroke speed corresponding signal that corresponds to a stroke speed of the control object;
a damping force variable damper configured to vary a damping force thereof in response to a control signal; and
a control apparatus configured to: calculate a target damping force amount based on the acceleration detection signal, calculate a stroke speed based on the stroke speed corresponding signal, and calculate a present damping force based on the stroke speed and an actual current which is currently supplied to the damping force variable damper; and when generating the control signal based on the target damping force amount and the stroke speed, control a damping force variation rate of the damping force variable damper to be a predetermined damping force variation rate, which is smaller than a predetermined oil hammer occurrence damping force variation rate at which an oil hammer occurs, wherein, when the damping force variation rate, which is calculated based on a difference between the target damping force and the present damping force, is greater than the predetermined oil hammer occurrence damping force variation rate, the control apparatus controls the damping force variation rate to be the predetermined damping force variation rate.

6. The control system according to claim 5, wherein the stroke sensor is configured as an acceleration sensor that detects the acceleration of the control object in a stroke direction or a height sensor that detects a height of the control object in the stroke direction.

7. A method executed by a control system including a damping force variable damper configured to vary a damping force thereof, the method comprising:
detecting an acceleration of a control object of the damping force variable damper and a value corresponding to a stroke speed;
calculating a target damping force amount based on the acceleration, stroke speed based on the value corresponding to the stroke speed, and a present damping force based on the stroke speed and an actual current which is currently supplied to the damping force variable damper; and
controlling a damping force variation rate of the damping force variable damper to be a predetermined damping force variation rate which is smaller than a predetermined oil hammer occurrence damping force variation rate at which an oil hammer occurs, wherein, when the damping force variation rate, which is calculated based on a difference between the target damping force and the present damping force, is greater than the predetermined oil hammer occurrence damping force variation rate, the damping force variation rate is controlled to be the predetermined damping force variation rate.

* * * * *